United States Patent
Sofman et al.

(10) Patent No.: US 8,201,206 B2
(45) Date of Patent: Jun. 12, 2012

(54) SYSTEM AND METHOD FOR DETERMINING CACHE MEMORY SIZE AT A NETWORK NODE OF AN IPTV NETWORK

(75) Inventors: Lev B Sofman, Allen, TX (US); Bill Krogfoss, Frisco, TX (US)

(73) Assignee: Alcatel Lucent, Paris (FR)

( * ) Notice: Subject to any disclaimer, the term of this patent is extended or adjusted under 35 U.S.C. 154(b) by 371 days.

(21) Appl. No.: 12/533,027

(22) Filed: Jul. 31, 2009

(65) Prior Publication Data
US 2010/0037275 A1   Feb. 11, 2010

Related U.S. Application Data

(60) Provisional application No. 61/137,717, filed on Aug. 1, 2008.

(51) Int. Cl.
*H04N 7/173* (2006.01)
(52) U.S. Cl. .............. 725/94; 725/109; 711/112
(58) Field of Classification Search .......... 725/94, 725/109; 711/112, 113
See application file for complete search history.

(56) References Cited

OTHER PUBLICATIONS

Bill Krogfoss, Lev Sofman, and Anshul Agrawal, "Caching architecture and optimization strategies for IPTV networks", Bell Lab Technical Journal, to be published.
S. Ghandeharizadeh, and S. Shayandeh, "Greedy Cache Management Technique for mobile Devices", Data Engineering Workshop, 2007 IEEE 23rd International Conference, Apr. 2007, pp. 39-48.
S. Ghandeharizadeh, S. Shayandeh, and T. Helmi "To Share or Not to Share Storage in Mesh Networks: A System Throughout Perspective", 22nd International Conference on Advanced Information Networking and Applications, 2008.
Hao Chen, Hai Jin, Jianhua Sun, Xiaofei Liao, Dafu Deng, "A new proxy caching scheme for parallel video servers", Computer Networks and Mobile Computing, Oct. 2003, pp. 438-441.
C. Cobarzan and L. Boszormenyi, "Further Developments of a Dynamic Distributed Video Proxy-Cache System", Parallel, Distributed and Network-Based Processing, 15th EUROMICRO International Conference, Feb. 2007, pp. 349-357.
Jun Pyo Lee and Sung Han Park, "A cache management policy in proxy server for an efficient multimedia streaming service", in Proceedings of the Ninth International Symposium on Consumer Electronics, Jun. 2005, pp. 64-68.
Lev Sofman, Bill Krogfoss, and Anshul Agrawal, "Optimal Cache Partitioning in IPTV Network", in Proc. of 11th Communications and Networking Simulation Symposium, Apr. 2008, Ottawa, Canada, pp. 79-84.
Danny de_Vleeschauwer, Koen Laevens, Caching to reduce the peak rate, Alcatel-Lucent internal report, 2007.
S. Boyd, L. Vandenberghe, Convex Optimization, Cambridge University Press, 2004.
http://en.wikipedia.org/wiki/Zipf-Mandelbrot_law, Zipf-Mandelbrot Law.

*Primary Examiner* — Hunter Lonsberry
(74) *Attorney, Agent, or Firm* — RG & Associates LLC

(57) ABSTRACT

In an IPTV network, cache memory assigned to each DSLAM, Central Office (CO) or Intermediate Office (IO) can be determined by defining a network cost function having cache memory per DSLAM, cache memory per CO and cache memory per IO as decision variables. The network cost function can be minimized to determine the optimal cache memory size for the network. The network cost function can be subject to boundary constraints that the cache memory is between zero and a maximum cache memory size for each network node type, allowing the network cost function to be solved as a 3-ary tree.

20 Claims, 8 Drawing Sheets

SYSTEM AND METHOD FOR DETERMINING CACHE MEMORY SIZE AT A NETWORK NODE OF AN IPTV NETWORK

CROSS REFERENCE TO RELATED APPLICATIONS

This application claims priority to U.S. provisional patent application Ser. No. 61/137,717, filed Aug. 1, 2008, the entire contents of which are herein incorporated by reference.

FIELD OF THE INVENTION

This invention relates to Internet Protocol Television (IPTV) networks and in particular to caching of video content within the network.

BACKGROUND OF THE INVENTION

IPTV networks in metro areas have a hierarchical structure. At the top of this hierarchy, shown in FIG. 1, is a Video Hub office (VHO) 19 where all video contents are stored in video servers. The VHO 19 is connected to several Intermediate Offices (IO) 18, every IO 18 is connected to several Central Offices (CO) 16, every CO 16 is connected to several Digital Subscriber Line Access Multiplexers (DSLAMs) 14, and every DSLAM 14 is connected to a certain number of subscribers 12.

In an IPTV network, Video on Demand and other video services generate large amounts of unicast traffic from VHO 19 to subscribers 12 and, therefore, require additional bandwidth and equipment resources in the network. To reduce this traffic (and overall network cost), part of video content (e.g. most popular titles) may be stored in caches 15 closer to subscribers, e.g., in DSLAM 14, in service switches at COs 16, or in service routers at IO 18.

On one hand, cache memory has a cost, but on another hand, caching of video content allows decreasing amount of traffic from upstream levels of this hierarchy and, therefore decreasing of network cost. Cache effectiveness is defined as the hit rate, i.e. the ratio of traffic that is served from the cache to the total amount of requested traffic. Hit rate depends on size and throughput of the cache, statistical characteristics of the traffic (e.g., popularity distribution of different titles, their bit rate, size in memory) and on a caching algorithm. For an ideal caching algorithm, the cache size and statistical characteristics of the traffic define hit rate.

Another important factor is granularity of network elements. In case of cache that means that cache is allocated in units whose size does not exceed some limit; cost of cache includes cache unit cost and cost per unit of memory. In case of equipment (switches, routers), cost includes unit cost, I/O module (IOM) cost, Model Driven Architecture (MDA) cost and port cost. The number of ports, MDA, IOMs and equipment units are defined by traffic as a part of the dimensioning process. There is a limited number of IOMs per equipment, and these resources should be shared by the MDAs and cache units.

Overall, to find an optimal (in terms of network cost) location and amount of cache memory is a complex optimization problem.

What is required is a system and method for optimizing a cache arrangement in an IPTV network.

SUMMARY OF THE INVENTION

In one aspect of the disclosure there is provided a method for determining cache memories of one or more network nodes of an Internet Protocol Television (IPTV) network. A network cost function is defined comprising a plurality of cache memory decision variables that represent a cache memory size at one of the one or more network nodes and at least one cache hit rate function dependent on at least one of the cache memory decision variables. The network cost function is optimized to determine the plurality of cache memory decision variables.

In one aspect of the disclosure, there is provided an Internet Protocol Television network comprising a plurality of network nodes, a plurality of the network nodes comprising a cache, wherein a size of the memory of the cache is in accordance with a minimum solution of a network cost function for the network.

In one aspect of the disclosure, there is provided a computer-readable medium comprising computer-executable instructions for execution by a processor that, when executed cause the processor to receive a plurality of input parameters and calculate a cache memory size for a plurality of network nodes of an Internet Protocol TeleVision network that minimizes a network cost of the Internet Protocol TeleVision network.

BRIEF DESCRIPTION OF THE DRAWINGS

Reference will now be made to specific embodiments, presented by way of example only, and to the accompanying drawings in which.

DETAILED DESCRIPTION OF THE INVENTION

Figure 1:
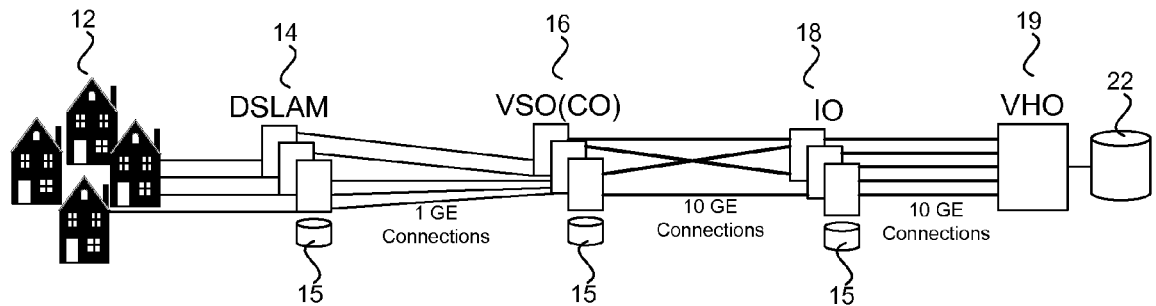
FIG. 1 illustrates an architecture of an IPTV network.
Figure 2:
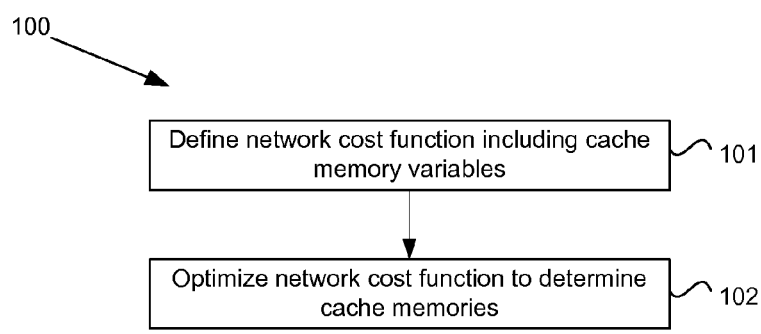
FIG. 2 illustrates a method for determining cache memory size.

In FIG. 2, there is shown a method 100 for determining cache memories of one or more nodes of the IPTV network. At step 101, a network cost function is defined that includes a plurality of cache memory decision variables that represent a cache memory size the network nodes and at least one cache hit rate function dependent on the cache memory decision variables. The network cost function is optimized at step 102 to determine the plurality of cache memory decision variables.

The present disclosure thus describes an analytical model of hierarchical cache optimization. This model depends on basic parameters such as traffic, topology, and cost parameters. More simple cost structure and some reasonable assumptions allow an analytically optimal solution of the problem and an analysis of the factors that impact the solution. The optimal cache architecture may use caching at any combination of network hierarchy—DSLAM, CO and IO—depending on traffic, topology, and cost parameters, and thus hierarchical caching may be an important option for cost saving.

Content caching is one of the most effective solutions to improve performance and cost effectiveness of multimedia services. In the present Applicant's copending patent application, U.S. patent application Ser. No. 12/284,079, the entire contents of which are incorporated herein by reference, a simplified analytical model for cache optimization was presented. The total network cost in this model was the sum of transport cost and memory cost, where the transport cost was proportional to the traffic amount that traverses the equipment, and memory cost was proportional to the memory size. In the Applicant's earlier patent application, unlike the present disclosure, no boundary cases (i.e., case without cache or with maximum cache size) were considered and network cost minimum assumed to be at a stable point (i.e., where derivative of network cost by appropriate parameters is equal to zero). The present disclosure demonstrates that boundary cases can be important for understanding why in some cases optimal solution does not require caching at some levels, or requires using maximum allowed cache size on another levels. However, boundary cases introduce significant complexity to the problem because they generate a large number of cases to be considered.

The Applicant's copending patent application, PCT application Number PCT/US 08/10269, filed on Aug. 29, 2008 which is based on and claims priority from U.S. Provisional Patent Application No. 60/969,162 filed 30 Aug. 2007, the entire contents of which are herein incorporated by reference, describes the concept of content cacheability and a fast algorithm that uses cacheability to optimally partition a cache between several video services with different traffic characteristics and content sizes. The goal of the optimization was to serve maximum (in terms of bandwidth) amount of subscribers' requests subject to constraints on cache memory and throughput.

In order to solve a cache optimization problem analytically in accordance with the present disclosure, some simplifying assumptions are made.

First, granularity factors mentioned above are ignored. In particular, it is assumed that cost of cache is proportional to cache size and equipment cost is proportional to amount of traffic that traverse the equipment. More specifically, the equipment cost is estimated based on amount of traffic received by this equipment from upstream levels of network hierarchy (upstream traffic) and on amount of traffic send by this equipment downstream (downstream traffic). In order to calculate a total network cost, a unit cost of cache memory is defined for each level of network hierarchy (DSLAM, CO, IO). A unit cost of upstream and downstream traffic is also defined, as will be described in greater detail below.

Figure 3:
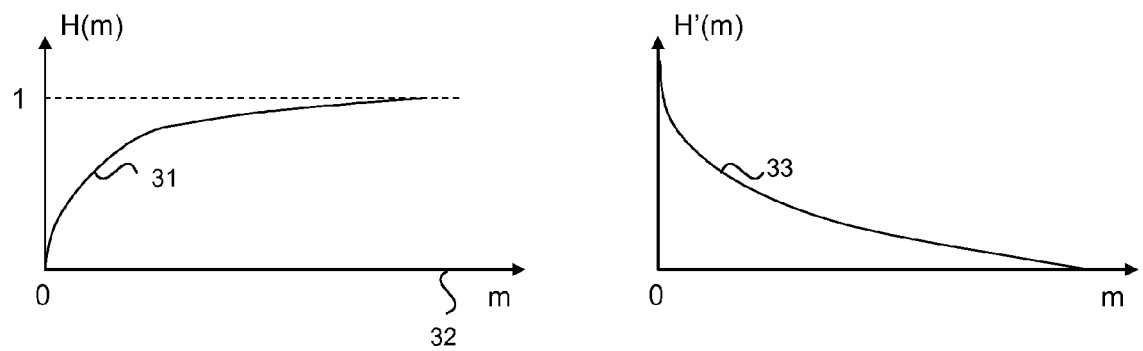
FIG. 3 illustrates a hit rate function and its derivative.

The next assumption regards hit rate, H(m), as a function of cache memory m. Hit rate, H(m) 31, increases with memory m 32 as shown in FIG. 3. In addition to that, it is assumed that function H(m) has a continuous derivative H'(m) 33 and this derivative decreases (effect of diminishing return for hit rate). This condition means that function H(m) is strictly concave. To justify this assumption it is noted that function H'(m) in some ideal cases (when caching algorithm has complete information about statistical characteristics of the traffic) is equivalent to a popularity curve, which, indeed, decreases as a function of a title's rank. In case of multiple services, hit rate depends on popularity distribution and other characteristics of individual services, as described in the Applicant's copending patent application, PCT application Number PCT/US 08/10269, referenced above.

Because an IPTV network has a hierarchical (tree) structure and traffic is downstream-oriented, a concept of a "virtual" cache can be used. The "virtual" cache in any node of the tree is the actual cache at the node augmented by the cache sizes in a node deeper (towards the leafs) in the tree. A video content residing in the "virtual" cache of the node (i.e., in the node itself or in a node further down the tree) reduces the unicast traffic on the feeder link towards that node (and on all links towards the root of the tree). In the following, it is assumed that out of two cache resources—cache size and cache throughput—cache size is a limiting factor and the only resource to be considered. This assumption can be justified for a cache in DSLAM by setting a maximum cache size that guarantees that traffic from the cache does not exceed cache throughput. In this case, for a given traffic pattern of IPTV subscribers, if cache size per DSLAM is $m_1$, cache size per service switch at CO is $m_2$, and cache size per service router at IO is $m_3$, then caching related traffic reduction (hit rate) at CO level is $H(m_1+m_2)$, and traffic reduction at IO level is $H(m_1+m_2+m_3)$.

This model considers unicast traffic only. Multicast traffic is a relatively small portion of total traffic on CO and IO levels and, therefore, does not make a big impact on equipment cost on those levels. Multicast traffic is a significant part of the total traffic on DSLAM level. However, there is almost no dependency of DSLAM cost on amount of traffic that traverses DSLAMs.

NOTATION AND MATHEMATICAL FORMULATION

Notations

Decision Variables:
$m_1$—cache memory size per DSLAM (GB);
$m_2$—cache memory size per service switch at CO (GB);
$m_3$—cache memory size per service router at IO (GB).

Traffic and Topology Parameters:
T—total amount of traffic requested by subscribers (Mbs);
H(m)—hit rate function;
$N_1$—total number of DSLAMs in the network;
$N_2$—total number of service switches in all COs in the network (it may be several service switches per CO);
$N_3$—total number of service routers in all IOs in the network (it may be several service routers per IO);
$M_1$—maximum cache size per DSLAM (GB);
$M_2$—maximum cache size per service switch at CO (GB);
$M_3$—maximum cache size per service router at IO (GB).

Cost Parameters:
$c_1^m$—unit cost of cache memory in DSLAM ($/GB);
$c_1^m$—unit cost of cache memory in CO ($/GB);
$c_3^m$—unit cost of cache memory in CO ($/GB);
$c_{11}^t$ and $c_{12}^t$—unit cost of downstream and upstream traffic for DSLAM ($/Mbs);
$c_{21}^t$ and $c_{22}^t$—unit cost of downstream and upstream traffic for CO ($/Mbs);
$c_{31}^t$ and $c_{32}^t$—unit cost of downstream and upstream traffic for IO ($/Mbs);
$c_{41}^t$ and $c_{42}^t$—unit cost of downstream and upstream traffic for VHO ($/Mbs);

Mathematical Formulation

Total network cost, NtwkCost, may be calculated as:

$$NtwkCost = \sum_{i=1}^{3} N_i c_i^m m_i + Tc_{11}^t + \qquad (1)$$
$$T(c_{12}^t + c_{21}^t)(1 - H(m_1)) + T(c_{22}^t + c_{31}^t)(1 - H(m_1 + m_2)) +$$
$$T(c_{32}^t + c_{41}^t + c_{42}^t)(1 - H(m_1 + m_2 + m_3))$$

The goal is to minimize network cost subject to constraints on cache memory size:

$$NtwkCost(m_1, m_2, m_3) \to \min \qquad (2)$$

$$\text{Subject to } 0 \leq m_i \leq M_i, i=1, 2, 3 \qquad (3)$$

Analytical Solution—Methodology

Network cost (1) is a function of three variables $\vec{m} = (m_1, m_2, m_3)$ defined on polyhedral (3). Note, that this function is strictly convex (because hit rate function H is strictly concave according to the assumptions). The solution, uses the following result from calculus about minimum of a convex function:

Theorem

Figure 4:
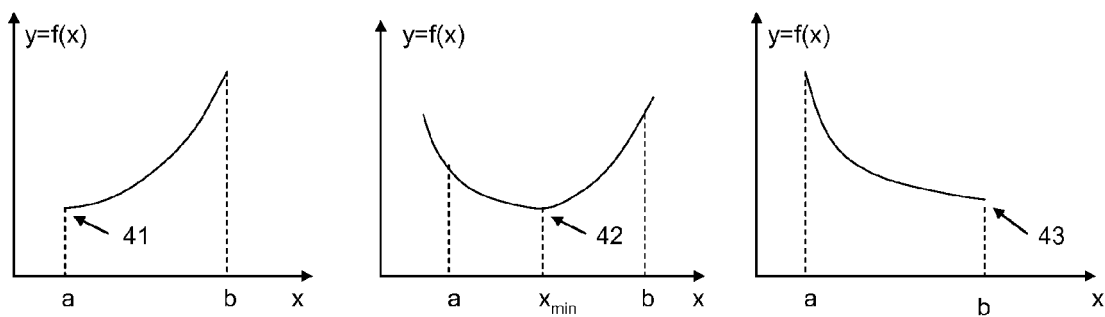
FIG. 4 illustrates a minimum of a convex function on a segment.

Let function f(x) be defined on an interval [a,b], convex, and has derivative f'(x). Then one of the following should take place (FIG. 4):

(a) f(x) attains its minimum 41 at x=a, i.e. f'(a)≧0;
(b) f(x) attains its minimum 42 at x=$x_{min}$, a<$x_{min}$<b, i.e. f'($x_{min}$)=0;
(c) f(x) attains its minimum 43 at x=b, i.e. f'(b)≦0.

Consider partial derivatives of the network cost function (1):

$$\frac{\partial(NtwkCost)}{\partial m_1} = \qquad (4)$$
$$N_1 c_1^m - Ts_1 H'(m_1) - Ts_2 H'(m_1 + m_2) - Ts_3 H'(m_1 + m_2 + m_3)$$

$$\frac{\partial(NtwkCost)}{\partial m_2} = N_2 c_2^m - Ts_2 H'(m_1 + m_2) - Ts_3 H'(m_1 + m_2 + m_3) \qquad (5)$$

$$\frac{\partial(NtwkCost)}{\partial m_3} = N_3 c_3^m - Ts_3 H'(m_1 + m_2 + m_3) \qquad (6)$$

Where:

$$s_1 = c_{12}{}^t + c_{21}{}^t$$

$$s_2 = c_{22}{}^t + c_{31}{}^t$$

$$s_3 = c_{32}{}^t + c_{41}{}^t + c_{42}{}^t \qquad (7)$$

Let $\vec{m}^o = (m_1^o, m_2^o, m_3^o)$ denote an optimal solution of the problem. The process of network cost minimization for this problem has two phases—forward and backward, and each phase includes three steps. On each step, partial derivatives of network cost (1) are considered at $\vec{m}^o$ by one variable and fixing two other variables.

Forward phase includes the following three steps:

$1^{st}$ step: minimize network cost (1) by $m_3$ for $m_1 = m_1^o$, $m_2 = m_2^o$ using (6).

$2^{nd}$ step: minimize network cost (1) by $m_2$ for $m_1 = m_1^o$, $m_3 = m_3^o$ using (5) and results of optimization on the previous step.

$3^{rd}$ step: minimize network cost (1) by $m_1$ for $m_2 = m_2^o$, $m_3 = m_3^o$ using (4) and results of optimization on the previous step.

There are three alternatives to be considered on every step of the optimization process: zero cache size (no caching), some optimal non-zero cache size (moderate caching), or maximum cache size (maximum caching).

Figure 5:
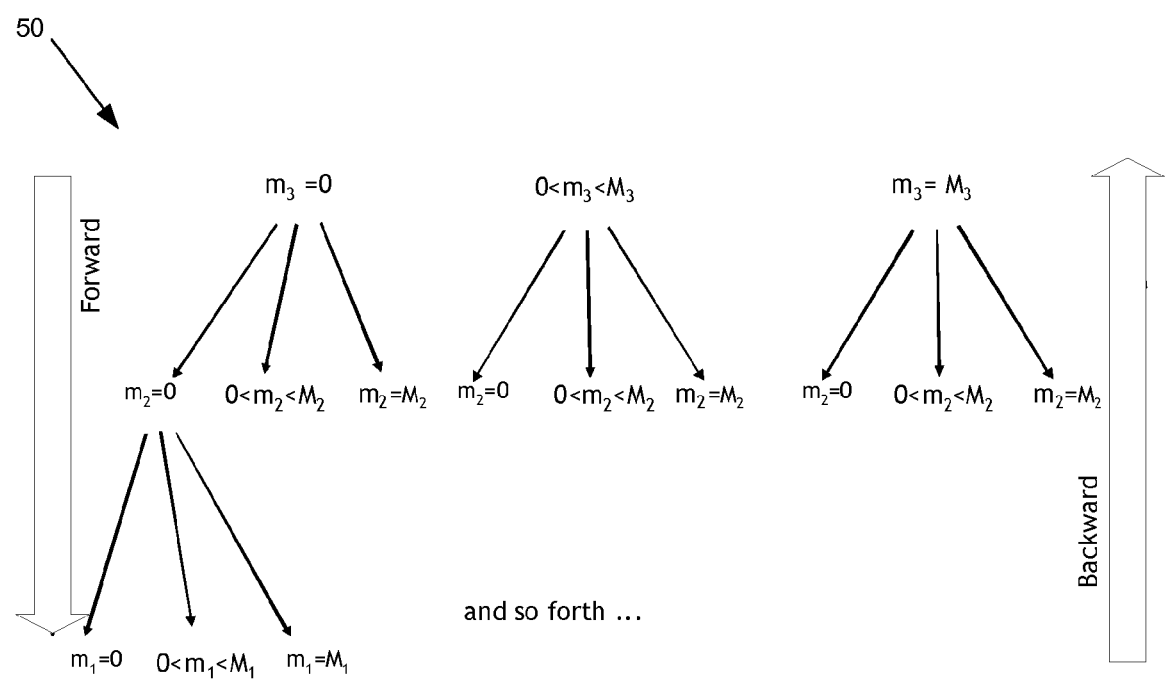
FIG. 5 illustrates a logical 3-ary tree.

Overall, the optimization process may be presented as a movement along the logical 3-ary tree 50 with $3^3 = 27$ leaves, as shown in FIG. 5. The forward phase moves down to the leaves of the tree. The backward phase moves up from the leaves of the tree.

Description of Analytical Solution

Forward Phase

On the $1^{st}$ step, network cost (1) is minimized by $m_3$ for $m_1 = m_1^o$, $m_2 = m_2^o$ using (6). Applying the theorem described above, there are the following three alternatives:

Case 1: $m_3^o = 0$, and $\frac{\partial(NtwkCost)}{\partial m_3}(\vec{m}^o) \geq 0$, or $Ts_3 H'(m_1^o + m_2^o) \leq N_3 c_3^m$;

Case 2: $0 < m_3^o < M_3$, and $\frac{\partial(NtwkCost)}{\partial m_3}(\vec{m}^o) = 0$, or $Ts_3 H'(m_1^o + m_2^o + m_3^o) = N_3 c_3^m$;

Case 3: $m_3^o = M_3$, and $\frac{\partial(NtwkCost)}{\partial m_3}(\vec{m}^o) \leq 0$, or $Ts_3 H'(m_1^o + m_2^o + M_3) \geq N_3 c$.

On the $2^{nd}$ step, for every case of the $1^{st}$ step, three alternatives, $m_2^o = 0$, $0 < m_2^o < M_2$, and $m_2^o = M_2$ are considered, so there are a total of 9 cases on this step: 1.1, 1.2, 1.3, 2.1, 2.2, 2.3, 3.1, 3.2, and 3.3.

Finally, on the $3^{rd}$ step, for every of the 9 cases of the $2^{nd}$ step, three alternatives, $m_1^o = 0$, $0 < m_1^o < M_1$, and $m_1^o = M_1$, are considered, so there are a total of 27 cases on this step. By the end of this step, 9 values for $m_1^o$, an optimal value for $m_1$, can be identified by analyzing 9 sets of cases: 1.1.x, 1.2.x, 1.3.x, 2.1.x, 2.2.x, 2.3.x, 3.1.x, 3.2.x and 3.3.x, where x=1, 2 and 3. For every of those alternative cases, $m_1^o = 0$, if H'(0)≦P, $m_1^o$ is a solution of equation H'($m_1^o$)=P, or $m_1^o = M_1$, if H'($M_1$)≧P, where P depends on input parameters. These solutions will be termed "seeds" herein.

Here a detailed description of the $2^{nd}$ and $3^{rd}$ steps of the forward phase is provided.

On the $2^{nd}$ step, the network cost (1) is minimized by $m_2$ for $m_1 = m_1^o$, $m_3 = m_3^o$ using (5).

For the Case 1, (5) becomes:

$$\frac{\partial(NtwkCost)}{\partial m_2}(\vec{m}^o) = N_2 c_2^m - Ts_2 H'(m_1^o + m_2^o) - Ts_3 H'(m_1^o + m_2^o)$$

Applying the theorem, there are the following three alternatives:

Case 1.1: $m_2^o = 0$, and $\frac{\partial(NtwkCost)}{\partial m_2}(\vec{m}^o) \geq 0$, or $T(s_2 + s_3) H'(m_1^o) \leq N_2 c_2^m$;

Case 1.2: $0 < m_2^o < M_2$, and $\frac{\partial(NtwkCost)}{\partial m_2}(\vec{m}^o) = 0$, or $$T(s_2 + s_3)H'(m_1^o + m_2^o) = N_2 c_2^m;$$

Case 1.3: $m_2^o = M_2$, and $\frac{\partial (NtwkCost)}{\partial m_2}(\vec{m}^o) \leq 0$, or $$T(s_2 + s_3)H'(m_1^o + M_2) \geq N_2 c_2^m.$$

For the Case 2, (5) becomes:

$$\frac{\partial (NtwkCost)}{\partial m_2}(\vec{m}^o) = (N_2 c_2^m - N_3 c_3^m) - Ts_2 H'(m_1^o + m_2^o)$$

Applying the theorem, there are the following three alternatives:

Case 2.1: $m_2^o = 0$, and $\frac{\partial (NtwkCost)}{\partial m_2}(\vec{m}^o) \geq 0$, or $$Ts_2 H'(m_1^o) \leq N_2 c_2^m - N_3 c_3^m;$$

Case 2.2: $0 < m_2^o < M_2$, and $\frac{\partial (NtwkCost)}{\partial m_2}(\vec{m}^o) = 0$, or $$Ts_2 H'(m_1^o + m_2^o) = N_2 c_2^m - N_3 c_3^m;$$

Case 2.3: $m_2^o = M_2$, and $\frac{\partial (NtwkCost)}{\partial m_2}(\vec{m}^o) \leq 0$, or $$Ts_2 H'(m_1^o + M_2) \geq N_2 c_2^m - N_3 c_3^m.$$

For the Case 3, (5) becomes:

$$\frac{\partial (NtwkCost)}{\partial m_2}(\vec{m}^o) = N_2 c_2^m - Ts_2 H'(m_1^o + m_2^o) - Ts_3 H'(m_1^o + m_2^o + M_3)$$

Applying the theorem, there are the following three alternatives:

Case 3.1: $m_2^o = 0$, and $\frac{\partial (NtwkCost)}{\partial m_2}(\vec{m}^o) \geq 0$, or $$Ts_2 H'(m_1^o) + Ts_3 H'(m_1^o + M_3) \leq N_2 c_2^m;$$

Case 3.2: $0 < m_2^o < M_2$, and $\frac{\partial (NtwkCost)}{\partial m_2}(\vec{m}^o) = 0$, or $$Ts_2 H'(m_1^o + m_2^o) + Ts_3 H'(m_1^o + m_2^o + M_3) = N_2 c_2^m;$$

Case 3.3: $m_2^o = M_2$, and $\frac{\partial (NtwkCost)}{\partial m_2}(\vec{m}^o) \leq 0$, or $$Ts_2 H'(m_1^o + M_2) + Ts_3 H'(m_1^o + M_2 + M_3) \geq N_2 c_2^m.$$

Finally, network cost (1) is minimized by $m_1$ for $m_2 = m_2^o$, $m_3 = m_3^o$ using eq. 4. Here the following 9 cases from the $2^{nd}$ level of logical tree (FIG. 5) are considered.

For the Case 1.1, eq. 4 becomes:

$$\frac{\partial (NtwkCost)}{\partial m_1}(\vec{m}^o) = N_1 c_1^m - T(s_1 + s_2 + s_3)H'(m_1^o)$$

Case 1.1.1. $m_1^o = 0$, and $\frac{\partial (NtwkCost)}{\partial m_1}(\vec{m}^o) \geq 0$, or $$T(s_1 + s_2 + s_3)H'(0) \leq N_1 c_1^m;$$

Case 1.1.2. $0 < m_1^o < M_1$, and $\frac{\partial (NtwkCost)}{\partial m_1}(\vec{m}^o) = 0$, or $$T(s_1 + s_2 + s_3)H'(m_1^o) = N_1 c_1^m;$$

Case 1.1.3 $m_1^o = M_1$, and $\frac{\partial (NtwkCost)}{\partial m_1}(\vec{m}^o) \leq 0$, or $$T(s_1 + s_2 + s_3)H'(M_1) \geq N_1 c_1^m$$

For the Case 1.2, eq. 4 becomes:

$$\frac{\partial (NtwkCost)}{\partial m_1}(\vec{m}^o) = (N_1 c_1^m - N_2 c_2^m) - Ts_1 H'(m_1^o)$$

Case 1.2.1. $m_1^o = 0$, and $\frac{\partial (NtwkCost)}{\partial m_1}(\vec{m}^o) \geq 0$, or $$Ts_1 H'(0) \leq N_1 c_1^m - N_2 c_2^m;$$

Case 1.2.2. $0 < m_1^o < M_1$, and $\frac{\partial (NtwkCost)}{\partial m_1}(\vec{m}^o) = 0$, or $$Ts_1 H'(m_1^o) = N_1 c_1^m - N_2 c_2^m;$$

Case 1.2.3. $m_1^o = M_1$, and $\frac{\partial (NtwkCost)}{\partial m_1}(\vec{m}^o) \leq 0$, or $$Ts_1 H'(M_1) \geq N_1 c_1^m - N_2 c_2^m.$$

For the Case 1.3, eq. 4 becomes:

$$\frac{\partial (NtwkCost)}{\partial m_1}(\vec{m}^o) =$$
$$N_1 c_1^m - Ts_1 H'(m_1^o) - Ts_2 H'(m_1^o + M_2) - Ts_3 H'(m_1^o + M_2)$$

Case 1.3.1. $m_1^o = 0$, and $\frac{\partial (NtwkCost)}{\partial m_1}(\vec{m}^o) \geq 0$, or $$Ts_1 H'(0) + Ts_2 H'(M_2) + Ts_3 H'(M_2) \leq N_1 c_1^m;$$

Case 1.3.2. $0 < m_1^o < M_1$, and $\frac{\partial (NtwkCost)}{\partial m_1}(\vec{m}^o) = 0$, or $$Ts_1 H'(m_1^o) + Ts_2 H'(m_1^o + M_2) + Ts_3 H'(m_1^o + M_2) = N_1 c_1^m$$

Case 1.3.3. $m_1^o = M_1$, and $\frac{\partial (NtwkCost)}{\partial m_1}(\vec{m}^o) \leq 0$, or $$Ts_1 H'(M_1) + Ts_2 H'(M_1 + M_2) + Ts_3 H'(M_1 + M_2) \geq N_1 c_1^m$$

For the Case 2.1, eq. 4 becomes:

$$\frac{\partial (NtwkCost)}{\partial m_1}(\vec{m}^o) = (N_1 c_1^m - N_3 c_3^m) - T(s_1 + s_2)H'(m_1^o)$$

Case 2.1.1. $m_1^o = 0$, and $\frac{\partial (NtwkCost)}{\partial m_1}(\vec{m}^o) \geq 0$, or $$T(s_1 + s_2)H'(0) \leq N_1 c_1^m - N_3 c_3^m;$$

Case 2.1.2. $0 < m_1^o < M_1$, and $\frac{\partial (NtwkCost)}{\partial m_1}(\vec{m}^o) = 0$ or $$T(s_1 + s_2)H'(m_1^o) = N_1 c_1^m - N_3 c_3^m;$$

Case 2.1.3. $m_1^o = M_1$, and $\frac{\partial (NtwkCost)}{\partial m_1}(\vec{m}^o) \leq 0$, or $$T(s_1 + s_2)H'(M_1) \geq N_1 c_1^m - N_3 c_3^m.$$

For the Case 2.2, eq. 4 becomes:

$$\frac{\partial(NtwkCost)}{\partial m_1}(\vec{m}^o) = (N_1 c_1^m - N_2 c_2^m) - Ts_1 H'(m_1^o)$$

Case 2.2.1. $m_1^o = 0$, and $\frac{\partial(NtwkCost)}{\partial m_1}(\vec{m}^o) \geq 0$, or $Ts_1 H'(0) \leq N_1 c_1^m - N_2 c_2^m;$ Case 2.2.2. $0 < m_1^o < M_1$, and $\frac{\partial(NtwkCost)}{\partial m_1}(\vec{m}^o) = 0$, or $Ts_1 H'(m_1^o) = N_1 c_1^m - N_2 c_2^m;$ Case 2.2.3. $m_1^o = M_1$, and $\frac{\partial(NtwkCost)}{\partial m_1}(\vec{m}^o) \leq 0$, or $Ts_1 H'(M_1) \geq N_1 c_1^m - N_2 c_2^m.$ For the Case 2.3, eq. 4 becomes:

$$\frac{\partial(NtwkCost)}{\partial m_1}(\vec{m}^o) = (N_1 c_1^m - N_3 c_3^m) - Ts_1 H'(m_1^o) - Ts_2 H'(m_1^o + M_2)$$

Case 2.3.1. $m_1^o = 0$, and $\frac{\partial(NtwkCost)}{\partial m_1}(\vec{m}^o) \geq 0$, or $Ts_1 H'(0) + Ts_2 H'(M_2) \leq N_1 c_1^m - N_3 c_3^m;$ Case 2.3.2. $0 < m_1^o < M_1$, and $\frac{\partial(NtwkCost)}{\partial m_1}(\vec{m}^o) = 0$, or $Ts_1 H'(m_1^o) + Ts_2 H'(m_1^o + M_2) = N_1 c_1^m - N_3 c_3^m;$ Case 2.3.3. $m_1^o = M_1$, and $\frac{\partial(NtwkCost)}{\partial m_1}(\vec{m}^o) \leq 0$, or $Ts_1 H'(M_1) + Ts_2 H'(M_1 + M_2) \geq N_1 c_1^m - N_3 c_3^m.$ For the Case 3.1, eq. 4 becomes:

$$\frac{\partial(NtwkCost)}{\partial m_1}(\vec{m}^o) = N_1 c_1^m - Ts_1 H'(m_1^o) - Ts_2 H'(m_1^o) - Ts_3 H'(m_1^o + M_3)$$

Case 3.1.1. $m_1^o = 0$, and $\frac{\partial(NtwkCost)}{\partial m_1}(\vec{m}^o) \geq 0$, or $T(s_1 + s_2) H'(0) + Ts_3 H'(M_3) \leq N_1 c_1^m;$ Case 3.1.2. $0 < m_1^o < M_1$, and $\frac{\partial(NtwkCost)}{\partial m_1}(\vec{m}^o) = 0$, or $T(s_1 + s_2) H'(m_1^o) + Ts_3 H'(m_1^o + M_3) = N_1 c_1^m;$ Case 3.1.3. $m_1^o = M_1$, and $\frac{\partial(NtwkCost)}{\partial m_1}(\vec{m}^o) \leq 0$, or $T(s_1 + s_2) H'(M_1) + Ts_3 H'(M_1 + M_3) \geq N_1 c_1^m.$ For the Case 3.2, eq. 4 becomes:

$$\frac{\partial(NtwkCost)}{\partial m_1}(\vec{m}^o) = (N_1 c_1^m - N_2 c_2^m) - Ts_1 H'(m_1^o)$$

Case 3.2.1. $m_1^o = 0$, and $\frac{\partial(NtwkCost)}{\partial m_1}(\vec{m}^o) \geq 0$, or $Ts_1 H'(0) \leq N_1 c_1^m - N_2 c_2^m;$ Case 3.2.2. $0 < m_1^o < M_1$, and $\frac{\partial(NtwkCost)}{\partial m_1}(\vec{m}^o) = 0$, or $Ts_1 H'(m_1^o) = N_1 c_1^m - N_2 c_2^m;$ Case 3.2.3. $m_1^o = M_1$, and $\frac{\partial(NtwkCost)}{\partial m_1}(\vec{m}^o) \leq 0$, or $Ts_1 H'(M_1) \geq N_1 c_1^m - N_2 c_2^m.$ For the Case 3.3, eq. 4 becomes as:

$$\frac{\partial(NtwkCost)}{\partial m_1}(\vec{m}^o) = N_1 c_1^m - Ts_1 H'(m_1^o) - Ts_2 H'(m_1^o + M_2) - Ts_3 H'(m_1^o + M_2 + M_3)$$

Case 3.3.1. $m_1^o = 0$, and $\frac{\partial(NtwkCost)}{\partial m_1}(\vec{m}^o) \geq 0$, or $Ts_1 H'(0) + Ts_2 H'(M_2) + Ts_3 H'(M_2 + M_3) \leq N_1 c_1^m;$ Case 3.3.2. $0 < m_1^o < M_1$, and $\frac{\partial(NtwkCost)}{\partial m_1}(\vec{m}^o) = 0$, or $Ts_1 H'(m_1^o) + Ts_2 H'(m_1^o + M_2) + Ts_3 H'(m_1^o + M_2 + M_3) = N_1 c_1^m;$ Case 3.3.3. $m_1^o = M_1$, and $\frac{\partial(NtwkCost)}{\partial m_1}(\vec{m}^o) \leq 0$, or $Ts_1 H'(M_1) + Ts_2 H'(M_1 + M_2) + Ts_3 H'(M_1 + M_2 + M_3) \geq N_1 c_1^m;$ At this point, up to 9 candidates for the optimal solution can be identified though the actual number of candidates for the optimal solution may be less than 9, because of possible infeasibility. In order to select the most optimal solution, a "backward" process can be used in the tree hierarchy.

Backward Phase

Every "seed" $m_1^o$ found on the $3^{rd}$ step of the forward phase, can be checked to see if a feasible solution $m_2^o$ exists for a "parent" case. For example, if "seed" $m_1^o$ was found as a solution of case 2.3.x of the $3^{rd}$ step of forwarding phase, then a check is made of the inequality in case 2.3: $Ts_2 H'(m_1^o + M_2) \geq N_2 c_2^m - N_3 c_3^m$. If this inequality is true, then corresponding value for $m_2^o$ is $M_2$, which may be defined as a "seed pair" $(m_1^o, m_2^o)$. Otherwise, there is no feasible solution for this "seed".

For every "seed pair" $(m_1^o, m_2^o)$ found on the previous step, a check can be made to see if a feasible solution $m_3^o$ exists for a "parent" case. For example, if "seed pair" $(m_1^o, m_2^o)$ was found as a solution of case 2.3 on the previous step, then a check may be made of case 2. If equation $Ts_3 H'(m_3^o + m_2^o + m_1^o) = N_3 c_3^m$ from case 2 has a feasible solution $m_3^o$, $0 < m_3^o < M_3$, then a "seed triple" $(m_1^o, m_2^o, m_3^o)$ may be defined. Otherwise, there is no feasible solution for this "seed pair".

Finally, the optimal solution can be selected out of the "seed triples" found above.

Analysis and Observations

The analytical solution presented above allows identifying conditions when the optimal solution requires moderate, maximum caching or does not require caching on different levels (DSLAM, CO, IO). Consider several examples.

Example 1

Optimal solution that does not require caching at all corresponds to the case 1.1.1 (and "parent" cases 1.1 and 1 in logical hierarchy). The corresponding equations are:

$$H'(0) \leq \frac{N_1 c_1^m}{T(s_1 + s_2 + s_3)} \text{ and } m_1^o = 0 \qquad (8)$$

-continued $$H'(m_1^o) \le \frac{N_2 c_2^m}{T(s_2+s_3)} \text{ and } m_2^o = 0 \quad (9)$$

$$H'(m_1^o + m_2^o) \le \frac{N_3 c_3^m}{T s_3} \text{ and } m_3^o = 0 \quad (10)$$

In order that equations (8)-(10) have a solution, the following inequality should take place:

$$H'(0) \le \min\left(\frac{N_1 c_1^m}{T(s_1+s_2+s_3)}, \frac{N_2 c_2^m}{T(s_2+s_3)}, \frac{N_3 c_3^m}{T s_3}\right) \quad (11)$$

Equation (11) indicates that if hit rate growth at 0 is below some threshold (this threshold depends on topology, traffic and cost parameters), no caching is required for the optimal solution.

Example 2

Optimal solution that requires moderate (i.e., below maximum cache size) caching on all three levels corresponds to the case 2.2.2 (and "parent" cases 2.2 and 2 in logical hierarchy). The corresponding equations are:

$$H'(m_1^o) = \frac{N_1 c_1^m - N_2 c_2^m}{T s_1} \text{ and } 0 < m_1^o < M_1 \quad (12)$$

$$H'(m_1^o + m_2^o) = \frac{N_2 c_2^m - N_3 c_3^m}{T s_2} \text{ and } 0 < m_2^o < M_2 \quad (13)$$

$$H'(m_1^o + m_2^o + m_3^o) = \frac{N_3 c_3^m}{T s_3} \text{ and } 0 < m_3^o < M_3 \quad (14)$$

If (12) has a solution $m_1^o$, its value may be substituted in (13). If (13) has a solution $m_2^o$, its value may be substituted in (14). If (14) has a solution $m_3^o$, that gives an optimal solution ($m_1^o$, $m_2^o$, $m_3^o$) that uses caching in DSLAM, CO and IO levels.

Example 3

Optimal solution that requires maximum caching (i.e., $m_i^o = M_i$, i=1, 2, 3) on all three levels corresponds to the case 3.3.3 (and "parent" cases 3.3 and 3 in logical hierarchy). The corresponding equations are:

$$s_1 H'(M_1) + s_1 H'(M_1 + M_2) + s_3 H'(M_1 + M_2 + M_3) \ge \frac{N_1 c_1^m}{T} \quad (15)$$

$$s_2 H'(M_1 + M_2) + s_3 H'(M_1 + M_2 + M_3) \ge \frac{N_2 c_2^m}{T} \quad (16)$$

$$s_3 H'(M_1 + M_2 + M_3) \ge \frac{N_3 c_3^m}{T} \quad (17)$$

Consider now the case when cache memory cost and equipment cost (in terms of cost per unit of traffic) does not depend on level of hierarchy (homogeneous cost):

$$c_1^m = c_2^m = c_3^m = c^m \quad (18)$$

$$c_{11}{}^t = c_{12}{}^t = c_{21}{}^t = c_{22}{}^t = c_{31}{}^t = c_{32}{}^t = c_{41}{}^t = c_{42}{}^t = c^t \quad (19)$$

Therefore, from eq. 7:

$$s_1 = s_2 = 2c^t \quad (20)$$

$$s_3 = 3c^t \quad (21)$$

Note, that if cost is homogeneous, optimal cache configuration for a given topology ($N_1$, $N_2$, $N_3$), hit rate function H and maximum cache sizes ($M_1$, $M_2$, $M_3$) depends on the ratio $$\frac{c^m}{Tc^t}.$$

Substituting (18)-(21) into (11), gives rise to the following condition of optimal solution without cache:

$$H'(0) \le \frac{c^m}{Tc^t} \min\left(\frac{N_1}{7}, \frac{N_2}{5}, \frac{N_3}{3}\right) \quad (11a)$$

Equation (11a) demonstrates an impact of hit rate, cost, traffic and topology parameters on optimal cache architecture. For example, the chances that the optimal solution does not require caching increases when:

Ratio $$\frac{c^m}{Tc^t}$$

of memory cost $c^m$ over equipment cost $c^t$ and traffic T is high;

Numbers of DSLAMs ($N_1$), COs ($N_2$) and IOs ($N_3$), but especially DSLAMs are large;

Hit rate function H has a small level of growth at 0.

Substituting (18)-(21) into (12)-(14), the following equations define a condition of optimal solution with moderate caching on all levels:

$$H'(m_1^o) = \frac{(N_1 - N_2)c^m}{2Tc^t} \text{ and } 0 < m_1^o < M_1 \quad (12a)$$

$$H'(m_1^o + m_2^o) = \frac{(N_2 - N_3)c^m}{2Tc^t} \text{ and } 0 < m_2^o < M_2 \quad (13a)$$

$$H'(m_1^o + m_2^o + m_3^o) = \frac{N_3 c^m}{3Tc^t} \text{ and } 0 < m_3^o < M_3 \quad (14a)$$

Substituting (18)-(21) into (15)-(17), the following equations define a condition of optimal solution with maximum caching on all levels:

$$2H'(M_1) + 2H'(M_1 + M_2) + 3H'(M_1 + M_2 + M_3) \ge \frac{N_1 c^m}{Tc^t} \quad (15a)$$

$$2H'(M_1 + M_2) + 3H'(M_1 + M_2 + M_3) \ge \frac{N_2 c^m}{Tc^t} \quad (16a)$$

$$3H'(M_1 + M_2 + M_3) \ge \frac{N_3 c^m}{Tc^t} \quad (17a)$$

Equations (15a)-(17a) demonstrate that the chances that the optimal solution requires maximum caching on all levels increases when:
Ratio $$\frac{c^m}{Tc^t}$$

of memory cost $c^m$ over equipment cost $c^t$ and traffic T is low;
Numbers of DSLAMs ($N_1$), COs ($N_2$) and IOs ($N_3$) are small;
Hit rate function H has a high level of growth at points $M_1$, $M_1+M_2$ and $M_1+M_2+M_3$.

Sensitivity Study

Objective

The impact of various parameters on optimal cache configuration will now be described using the following two metrics of optimal cache configuration:
Size of cache memory in DSLAM, CO and IO nodes, that is $\vec{m}^o=(m_1^o,m_2^o,m_3^o)$;
Cost gain characterizes a potential cost savings from caching and defined as $1-NtwkCost_{opt}/NtwkCost_{NoCache}$, where $NtwkCost_{opt}$ is a cost (1) of network with optimal cache configuration, and $NtwkCost_{NoCache}$ is a cost (1) of network without cache.

Reference Scenario

As a reference scenario, there is considered a network defined by the following parameters:
$N_1$, a total number of DSLAMs in the network, is 9,600;
$N_2$, a total number of service switches in all COs, is 100;
$N_3$, a total number of service routers in all IOs, is 16;
Total amount of traffic, T, in reference network is 9,600,000 Mbs (i.e., 1 Gbs per DSLAM);
$M_1$, a maximum cache size per DSLAM, is 100 GB;
$M_2$, a maximum cache size per service switch at CO, is 12,000 GB;
$M_3$, a maximum cache size per service router at IO, is 24,000 GB.

It is assumed that the unit cost of cache memory in DSLAM, CO and IO is $22/GB. As for equipment cost (i.e., cost per unit of traffic), it is assumed that the unit cost of upstream DSLAM traffic is $1.5/Mbs, unit cost of upstream and downstream CO traffic is $2.5/Mbs, and unit cost of upstream and downstream IO and VHO traffic is $4/Mbs. That corresponds to S1=$4/Mbs, S2=$6.5/Mbs, and S3=$12/Mbs.

Hit rate function H(m) may be modeled in such a way that its derivative, H'(m), represents continuous version of Zipf-Mandelbrot distribution:

$$H'(m) = \frac{K}{(m+q)^\alpha},$$

truncated on interval [0,M], where $0<M\leq\infty$. Here, ZM power parameter $\alpha\geq0$ characterizes hit rate steepness at 0, shift parameter $q>0$, and K is normalization coefficient:

$$\int_0^M H'(m)dm = 1$$

For the reference case, chosen parameters may be a $\alpha=1$, $q=1$, and M=100,000.

In the following, there is shown the sensitivity of optimal cache sizes to various parameters.

Sensitivity to Power Parameter of ZM Distribution

Figure 6:
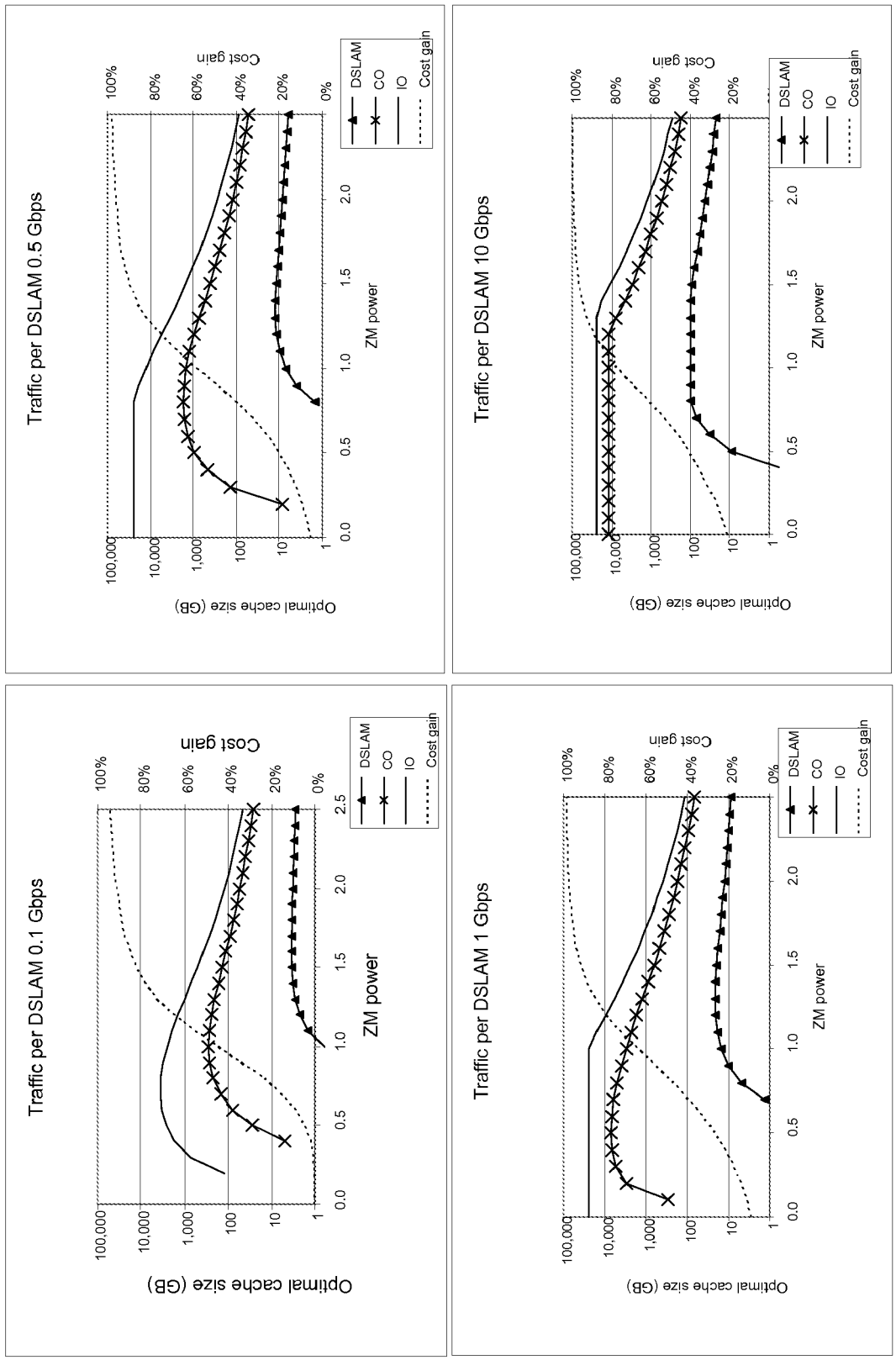
FIG. 6 illustrates an optimal cache configuration as a function of ZM power and traffic.

Sensitivity to power parameter of ZM distribution is shown for several levels of traffic per DSLAM: 0.1 Gbs, 0.5 Gbs, 1 Gbs and 10 Gbs (see FIG. 6).

Note, that for a small amount of traffic (e.g., 0.1 Gbs per DSLAM), the optimal amount of cache per node increases with ZM-power parameter up to some point, and then starts to decrease. When ZM-power parameter is small (i.e., hit rate is relatively flat) cache effectiveness is also small, so the optimal cache configuration uses a small amount of cache or no cache at all. With an increase of the ZM-power parameter, the cache effectiveness as well as cache size in the optimal configuration increases. After some point, further increases of ZM-power parameter has an inverse effect: i.e. the hit rate becomes so steep and cache effectiveness so high that the optimal result can be achieved with smaller and smaller amounts of cache size per node. Therefore, optimal cache size as a function of ZM-power parameter obtains its maximum at some point and declines after that. The maximum point of optimal cache size depends on total amount of traffic T and increases with increase of traffic. For a larger amount of traffic, when optimal cache size attains its limit, some boundary effect starts to play its role at first for cache at IO level, and then for cache at all three levels (IO, CO and DSLAM). In all considered scenarios, cost gain increases with power parameter.

Sensitivity to Traffic

Figure 7:
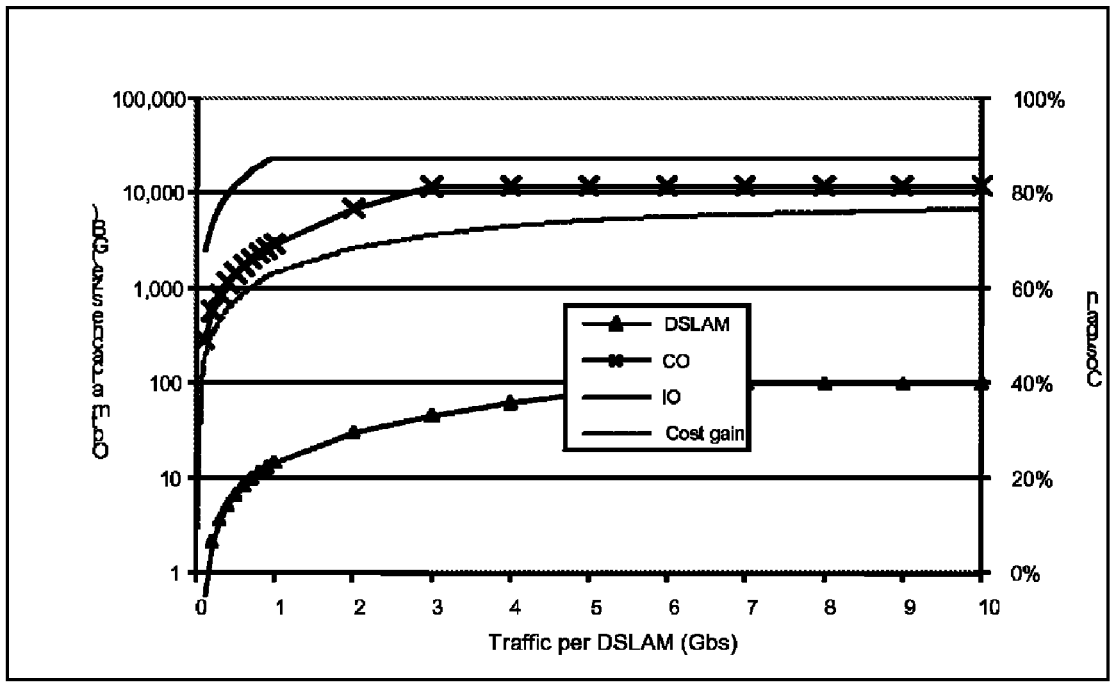
FIG. 7 illustrates an optimal cache configuration as a function of traffic.

The optimal amount of cache per DSLAM, CO and IO nodes, as well as cost gain, increases with traffic (see FIG. 7). To justify cache at DSLAM, traffic should exceed some threshold. This threshold decreases with increase of ZM-power parameter as we demonstrated earlier.

Sensitivity to Equipment Cost

Figure 8:
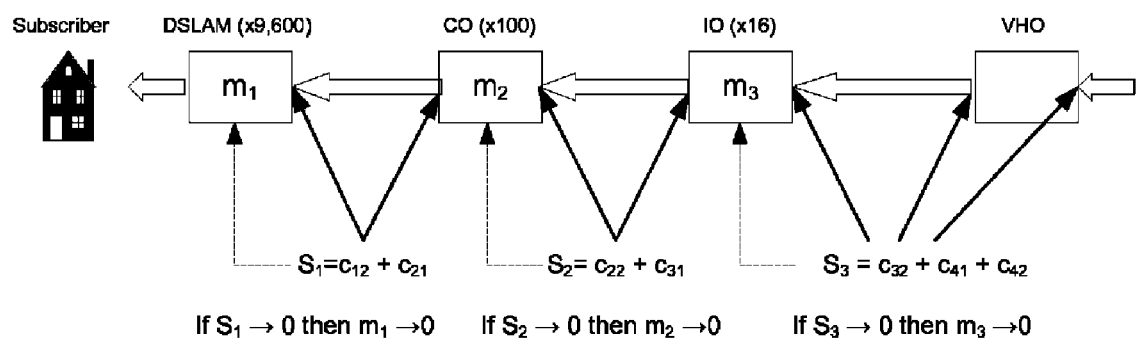
FIG. 8 illustrates an equipment cost structure and its impact on cache memory.

The optimal cache configuration depends on cost parameters $S_1$, $S_2$, and $S_3$, defined by (7). There is a strong impact of value $S_1$ on size of DSLAM cache, value of $S_2$ on size of CO cache and value $S_3$ on size of IO cache (see FIG. 8).

Figure 9:
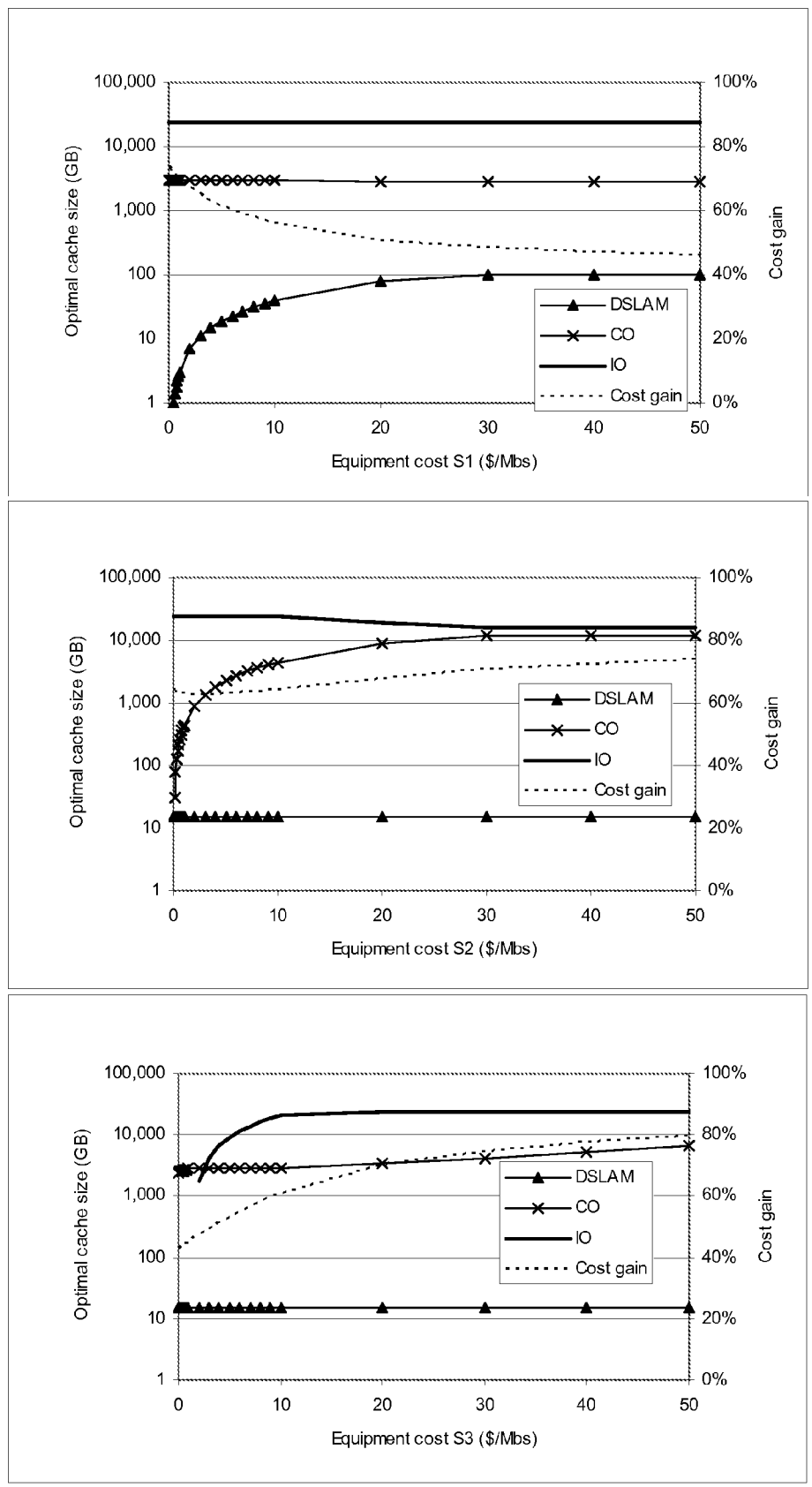
FIG. 9 illustrates an optimal cache configuration as a function of equipment cost.

In the same time, there may be an "isolation effect": i.e. there is a relatively small impact of $S_1$ on size of CO and IO cache, $S_2$ on size of DSLAM and IO cache and $S_3$ on size of DSLAM and CO cache (see FIG. 9).

For example, when $S_1$ tends to 0, DSLAM cache size also tends to 0 (similar effect for $S_2$ and $S_3$). Caching in DSLAM impacts all network cost elements upstream from DSLAM by reducing traffic (a) from CO to DSLAM, (b) from IO to CO and (c) from VHO to IO. However, while (a) may be reduced by DSLAM caching (but not by CO and IO caching), for reduction of (b) caching at DSLAM and/or at CO can be used, and for reduction of (c) caching at DSLAM, at CO, and/or at IO can be used. Now, assume that $S_1=0$ (or very small). In this case, caching at DSLAM makes no or small difference on network cost related to $S_1$, because for upstream network cost (related to $S_2$ and $S_3$ elements), it is preferred to use the same amount X GB of cache memory at CO than at DSLAM to achieve the same network cost reduction effect, but with smaller cost there is X GB of cache memory at each CO instead of X GB of memory at each DSLAM. Cost gain decreases with increase of equipment cost.

Sensitivity to Memory Cost

Figure 10:
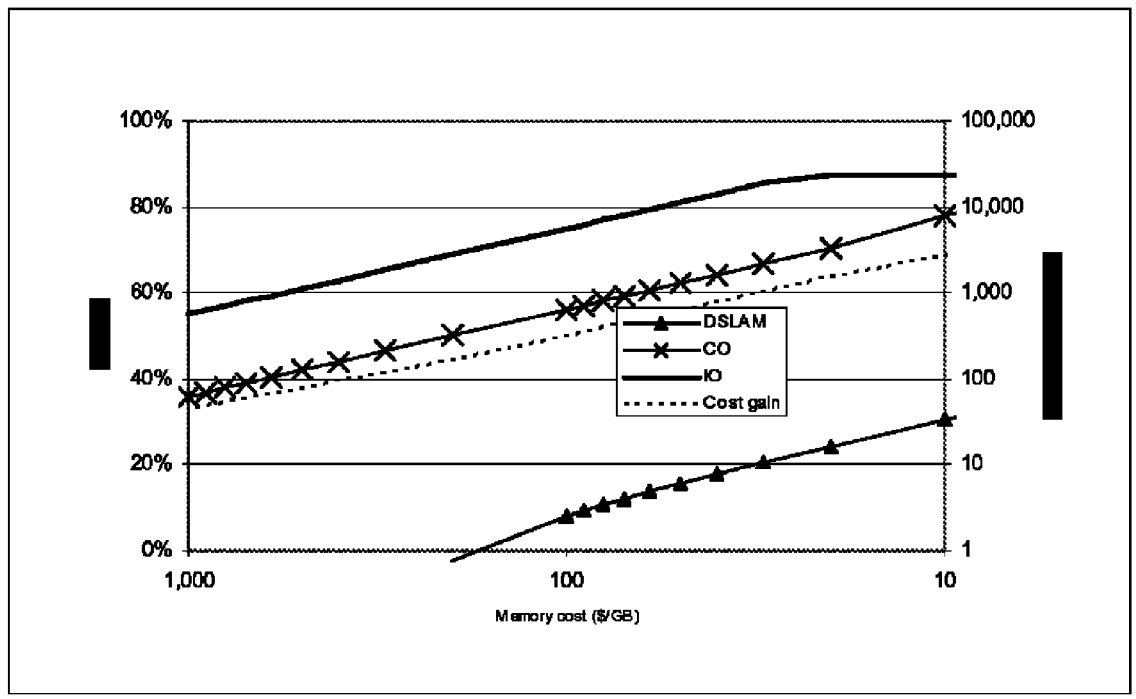
FIG. 10 illustrates an optimal cache configuration as a function of memory cost.

When memory cost drops, more cache is used in an optimal configuration (FIG. 10). The DSLAM cache as a part of optimal hierarchical configuration is used when cache cost is below some threshold.

As described herein, the analytical model allows a calculation of optimal cache configuration and to investigate how sensitive the solution is to various parameters of the system (traffic, topology, cost parameters).

Once an optimal solution of the network cost function has been determined and optimal values for the cache memory sizes $m_1$, $m_2$, and $m_3$ have been selected, the nodes of the network, i.e. the IOs 18, COs 16 and DSLAMs 14 can be provided with cache memory in accordance with the optimized solution.

Figure 11:
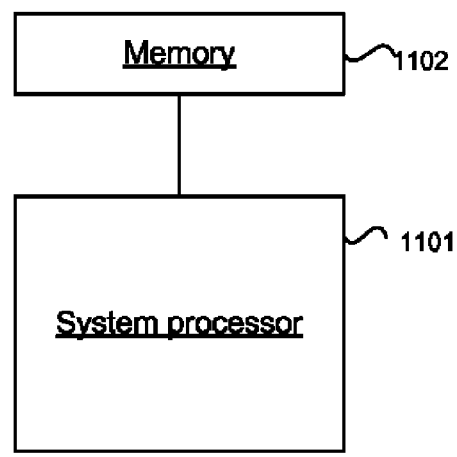
FIG. 11 illustrates a system processor and associated memory.
Figure 12:
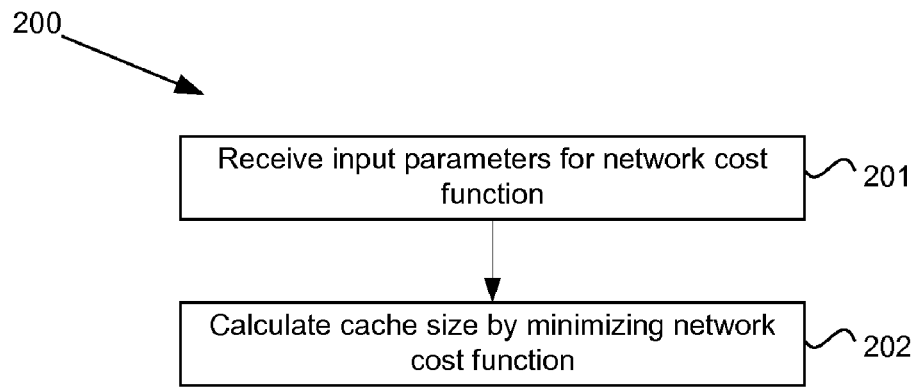
FIG. 12 illustrates an instruction set that may be executed on the processor of FIG. 11.
Figure 13:
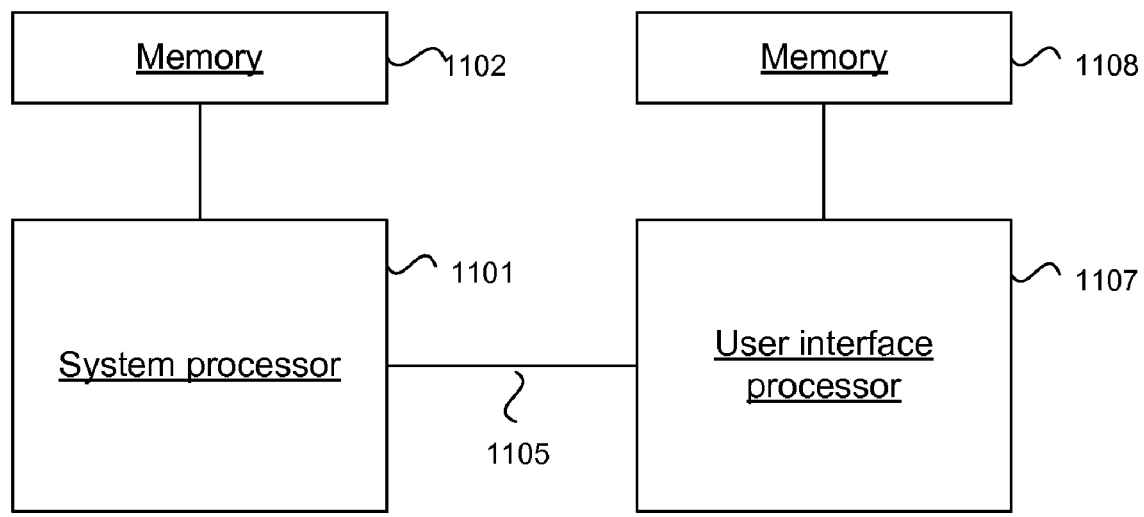
FIG. 13 illustrates a user processor and memory in association with the system processor of FIG. 11.

In one embodiment, the analytical model of the network cost function may embodied in a computer system including one or more processors 1101 as shown in FIG. 11. The processor 1101 may be a system processor operatively associated with a system memory 1102 that stores an instruction set such as software for calculating a network cost function. The process may cause a user interface (not shown) to display user prompts that allow a user to provide input parameters such as the traffic, topology and costing parameters as described above. An example instruction set is shown in the flowchart 200 of FIG. 12. At step 201, the processor receives the input parameters, e.g. through the user interface, and then at step 202, the processor calculates a cache memory size for a plurality of network nodes of an Internet Protocol TeleVision network that minimizes a network cost of the Internet Protocol TeleVision network.

The user interface may be displayed on a separate computer terminal such that the system processor 1101 may receive parameter information from a second processor 1107, such as a user processor which is also operatively associated with a memory 1108. The communication between the processors 1101, 1107 may be provided by a suitable communications link 1105 which may be hard wired, wireless, internet or FTP based, or any other suitable communications link.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for determining a plurality of cache memories of a plurality of network nodes of an Internet Protocol Television (IPTV) network comprising:
    defining a network cost function comprising:
        a plurality of cache memory decision variables that represent a corresponding plurality of cache memory sizes of the plurality of network nodes;
        at least one cache hit rate function dependent on at least one of the cache memory decision variables; and
    optimizing the network cost function to determine the plurality of cache memory decision variables and to determine the sizes of each of the plurality of cache memories of the plurality of network nodes.

2. The method according to claim 1 comprising providing cache memories at the one or more network nodes in accordance with an optimized solution of the network cost function.

3. The method according to claim 1 wherein optimizing the network cost function comprises minimizing the network cost function.

4. The method according to claim 1 wherein the at least one cache hit rate function is defined to have a continuous derivative.

5. The method according to claim 1 wherein the plurality of cache memory decision variables comprises a cache memory decision variable for two or more of an Intermediate Office, a Central Office and a Digital Subscriber Line Access Multiplexer.

6. The method according to claim 5 wherein the plurality of cache memory decision variables comprise a cache memory size per Digital Subscriber Line Access Multiplexer, a cache memory size per Central Office and a cache memory size per Intermediate Office.

7. The method according to claim 6 comprising optimizing the network cost function subject to the constraint that each cache memory decision variable is less than or equal to a maximum cache memory size at a respective network node.

8. The method according to claim 1 wherein optimizing the network cost function comprises determining a partial derivative of the network cost function with respect to a first of the plurality of cache memory decision variables and determining a candidate optimal value of the first of the plurality of cache memory decision variables from the partial derivative.

9. The method according to claim 8 wherein optimizing the network cost function comprises:
    determining a partial derivative of the network cost function with respect to a second of the plurality of cache memory decision variables;
    determining a candidate optimal value of the second of the plurality of cache memory decision variables from the partial derivative; and
    determining if the candidate optimal value of the first of the plurality of cache memory decision variables and the candidate optimal value of the second of the plurality of cache memory decision variables provide a feasible optimal solution of the network cost function.

10. The method according to claim 1 wherein the network cost function comprises the formula:

$$NtwkCost = \sum_{i=1}^{3} N_i c_i^m m_i + Tc_{11}^t +$$
$$T(c_{12}^t + c_{21}^t)(1 - H(m_1)) + T(c_{22}^t + c_{31}^t)(1 - H(m_1 + m_2)) +$$
$$T(c_{32}^t + c_{41}^t + c_{42}^t)(1 - H(m_1 + m_2 + m_3))$$

wherein:
   $m_1$ is a cache memory size per Digital Subscriber Line Access Multiplexer (GB);
   $m_2$ is a cache memory size per service switch at a Central Office (GB);
   $m_3$ is a cache memory size per service router at an Intermediate Office (GB);

T is a total amount of traffic requested by subscribers (Mbs);

H(m) is a hit rate function;

$N_1$ is a total number of Digital Subscriber Line Access Multiplexers (DSLAM)s in the network;

$N_2$ is a total number of service switches in all COs in the network;

$N_3$ is a total number of service routers in all IOs in the network;

$M_1$ is a maximum cache size per DSLAM (GB);

$M_2$ is a maximum cache size per service switch at CO (GB);

$M_3$ is a maximum cache size per service router at IO (GB);

$c_1^m$ is a unit cost of cache memory in DSLAM ($/GB);

$c_2^m$ is a unit cost of cache memory in CO ($/GB);

$c_3^m$ is a unit cost of cache memory in IO ($/GB);

$c_{11}^t$ and $c_{12}^t$ is a unit cost of downstream and upstream traffic for DSLAM ($/Mbs);

$c_{21}^t$ and $c_{22}^t$ is a unit cost of downstream and upstream traffic for CO ($/Mbs);

$c_{31}^t$ and $c_{32}^t$ is a unit cost of downstream and upstream traffic for IO ($/Mbs);

$c_{41}^t$ and $c_{42}^t$ is a unit cost of downstream and upstream traffic for VHO ($/Mbs).

11. The method according to claim 10 wherein optimizing the network cost function comprises a forward phase and a backward phase, wherein in the forward phase, a plurality of candidate optimal values are individually determined for each of $m_1$, $m_2$, and $m_3$ and wherein in a backward phase, a candidate optimal value for a first of $m_1$, $m_2$, and $m_3$ is tested to determine if the respective candidate optimal value provides a feasible solution of a second and third of $m_1$, $m_2$, and $m_3$.

12. The method according to claim 11 wherein values of $m_1$, $m_2$, and $m_3$ that provide a feasible solution of the network cost function form seed triples and wherein optimizing the network cost function comprises selecting the optimal seed triple.

13. The method according to claim 10 comprising determining if zero caching is required on all levels of the network for an optimal solution of the network cost function by determining whether the inequality:

$$H'(0) \leq \min\left(\frac{N_1 c_1^m}{T(s_1+s_2+s_3)}, \frac{N_2 c_2^m}{T(s_2+s_3)}, \frac{N_3 c_3^m}{Ts_3}\right)$$

is true.

14. The method according to claim 10 comprising determining if greater than zero and less than maximum caching is required on all levels of the network for an optimal solution of the network cost function by determining if each of the conditions:

$$H'(m_1^o) = \frac{N_1 c_1^m - N_2 c_2^m}{Ts_1} \text{ and } 0 < m_1^o < M_1;$$

$$H'(m_1^o + m_2^o) = \frac{N_2 c_2^m - N_3 c_3^m}{Ts_2} \text{ and } 0 < m_2^o < M_2;$$

and $$H'(m_1^o + m_2^o + m_3^o) = \frac{N_3 c_3^m}{Ts_3} \text{ and } 0 < m_3^o < M_3;$$

are met.

15. The method according to claim 10 comprising determining maximum caching is required on all levels of the network for an optimal solution of the network cost function by determining if each of the conditions:

$$s_1 H'(M_1) + s_1 H'(M_1 + M_2) + s_3 H'(M_1 + M_2 + M_3) \geq \frac{N_1 c_1^m}{T};$$

$$s_2 H'(M_1 + M_2) + s_3 H'(M_1 + M_2 + M_3) \geq \frac{N_2 c_2^m}{T}; \text{ and}$$

$$s_3 H'(M_1 + M_2 + M_3) \geq \frac{N_3 c_3^m}{T}$$

are met.

16. An Internet Protocol Television network system comprising:

a plurality of network nodes, the plurality of network nodes comprising a plurality of corresponding caches, and a memory configured to store a plurality of cache memory decision variables that represent a corresponding plurality of cache memory sizes of the plurality of network nodes, and at least one cache hit rate function dependent on at least one of the cache memory decision variables, wherein a size of the memory of each of the caches is determined in accordance with a minimum solution of a network cost function for the network by optimization of the network cost function to determine the plurality of cache memory decision variables and to determine the sizes of each of the plurality of cache memories of the plurality of network nodes.

17. The Internet Protocol Television network system according to claim 16 wherein the plurality of network nodes comprise one or more Intermediate Offices, one or more Central Offices and one or more Digital Subscriber Line Access Multiplexers.

18. The Internet Protocol Television network system according to claim 16 wherein the network cost function comprises the formula:

$$NtwkCost = \sum_{i=1}^{3} N_i c_i^m m_i + Tc_{11}^t +$$
$$T(c_{12}^t + c_{21}^t)(1 - H(m_1)) + T(c_{22}^t + c_{31}^t)(1 - H(m_1 + m_2)) +$$
$$T(c_{32}^t + c_{41}^t + c_{42}^t)(1 - H(m_1 + m_2 + m_3))$$

wherein:

$m_1$ is a cache memory size per Digital Subscriber Line Access Multiplexer (GB);

$m_2$ is a cache memory size per service switch at a Central Office (GB);

$m_3$ is a cache memory size per service router at an Intermediate Office (GB);

T is a total amount of traffic requested by subscribers (Mbs);

H(m) is a hit rate function;

$N_1$ is a total number of Digital Subscriber Line Access Multiplexers (DSLAM)s in the network;

$N_2$ is a total number of service switches in all COs in the network;

N₃ is a total number of service routers in all IOs in the network;

M₁ is a maximum cache size per DSLAM (GB);

M₂ is a maximum cache size per service switch at CO (GB);

M₃ is a maximum cache size per service router at IO (GB);

$c_1^m$ is a unit cost of cache memory in DSLAM ($/GB);

$c_2^m$ is a unit cost of cache memory in CO ($/GB);

$c_3^m$ is a unit cost of cache memory in IO ($/GB);

$c_{11}^t$ and $c_{12}^t$ is a unit cost of downstream and upstream traffic for DSLAM ($/Mbs);

$c_{21}^t$ and $c_{22}^t$ is a unit cost of downstream and upstream traffic for CO ($/Mbs);

$c_{31}^t$ and $c_{32}^t$ is a unit cost of downstream and upstream traffic for IO ($/Mbs);

$c_{41}^t$ and $c_{42}^t$ is a unit cost of downstream and upstream traffic for VHO ($/Mbs).

19. A non-transitory computer-readable storage medium comprising computer-executable instructions for execution by a processor that, when executed cause the processor to perform:

receiving a plurality of input parameters; and calculating a cache memory size for a plurality of network nodes of an Internet Protocol TeleVision network that minimizes a network cost of the Internet Protocol TeleVision network, the calculating further comprising defining a network cost function and utilizing a plurality of cache memory decision variables to represent a corresponding plurality of cache memory sizes of the plurality of network nodes, and by utilizing at least one cache hit rate function dependent on at least one of the cache memory decision variables to optimize the network cost function to determine the plurality of cache memory decision variables and to determine the sizes of each of the plurality of cache memories of the plurality of network nodes.

20. The non-transitory computer-readable storage medium according to claim 19 comprising a network cost function represented by:

$$NtwkCost = \sum_{i=1}^{3} N_i c_i^m m_i + T c_{11}^t +$$

$$T(c_{12}^t + c_{21}^t)(1 - H(m_1)) + T(c_{22}^t + c_{31}^t)(1 - H(m_1 + m_2)) +$$

$$T(c_{32}^t + c_{41}^t + c_{42}^t)(1 - H(m_1 + m_2 + m_3))$$

wherein:

$m_1$ is a cache memory size per Digital Subscriber Line Access Multiplexer (GB);

$m_2$ is a cache memory size per service switch at a Central Office (GB);

$m_3$ is a cache memory size per service router at an Intermediate Office (GB);

T is a total amount of traffic requested by subscribers (Mbs);

H(m) is a hit rate function;

N₁ is a total number of Digital Subscriber Line Access Multiplexers (DSLAM)s in the network;

N₂ is a total number of service switches in all COs in the network;

N₃ is a total number of service routers in all IOs in the network;

M₁ is a maximum cache size per DSLAM (GB);

M₂ is a maximum cache size per service switch at CO (GB);

M₃ is a maximum cache size per service router at IO (GB);

$c_1^m$ is a unit cost of cache memory in DSLAM ($/GB);

$c_2^m$ is a unit cost of cache memory in CO ($/GB);

$c_3^m$ is a unit cost of cache memory in IO ($/GB);

$c_{11}^t$ and $c_{12}^t$ is a unit cost of downstream and upstream traffic for DSLAM ($/Mbs);

$c_{21}^t$ and $c_{22}^t$ is a unit cost of downstream and upstream traffic for CO ($/Mbs);

$c_{31}^t$ and $c_{32}^t$ is a unit cost of downstream and upstream traffic for IO ($/Mbs);

$c_{41}^t$ and $c_{42}^t$ is a unit cost of downstream and upstream traffic for VHO ($/Mbs).

* * * * *